(12) United States Patent  
Magill et al.

(10) Patent No.: US 9,275,149 B2  
(45) Date of Patent: Mar. 1, 2016

(54) UTILIZING SOCIAL NETWORK RELEVANCY AS A FACTOR IN RANKING SEARCH RESULTS

(75) Inventors: Kevin N. Magill, Durham, NC (US); Michael S. O'Leary, Cary, NC (US); Mary K. Rees, Raleigh, NC (US); Michael S. Thomason, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 13/591,689

(22) Filed: Aug. 22, 2012

(65) Prior Publication Data

US 2014/0059029 A1 Feb. 27, 2014

(51) Int. Cl.  
*G06F 17/30* (2006.01)

(52) U.S. Cl.  
CPC .... *G06F 17/30864* (2013.01); *G06F 17/30876* (2013.01)

(58) Field of Classification Search  
CPC .......... G06F 17/3089; G06F 17/30887; G06F 17/30876; G06F 17/30864; G06F 17/30861  
USPC ........................................ 707/705–707, 709  
See application file for complete search history.

(56) References Cited

U.S. PATENT DOCUMENTS

| | | | |
|---|---|---|---|
| 4,996,642 A | 2/1991 | Hey | |
| 5,704,017 A | 12/1997 | Heckerman et al. | |
| 6,327,590 B1 | 12/2001 | Chidlovskii et al. | |
| 6,493,702 B1 | 12/2002 | Adar et al. | |
| 7,788,260 B2 | 8/2010 | Lunt et al. | |
| 8,091,032 B2 | 1/2012 | Fischer | |
| 8,166,028 B1 * | 4/2012 | Reynar et al. | 707/732 |
| 2006/0004892 A1 | 1/2006 | Lunt et al. | |
| 2006/0042483 A1 | 3/2006 | Work et al. | |
| 2006/0235873 A1 | 10/2006 | Thomas | |

(Continued)

FOREIGN PATENT DOCUMENTS

| | | |
|---|---|---|
| WO | 2009138755 A1 | 11/2009 |
| WO | 2011140609 A1 | 11/2011 |

OTHER PUBLICATIONS

"Tweefind a New Rank-Based Twitter Search", Apr. 6, 2009; http://blog.tmcnet.com/blog/tom-keating/social-networking/tweefind-a-new-rank-based-twitter-search.asp, 7 pages.

(Continued)

*Primary Examiner* — Monica Pyo  
(74) *Attorney, Agent, or Firm* — Joe Polimeni; Edell, Shapiro & Finnan, LLC

(57) ABSTRACT

A method, a system and a computer program product for influencing ranking of URLs in a search engine. In an example embodiment, a computer determines that a posting of a URL has occurred in a social networking environment, the computer tracks accesses of the URL subsequent to the posting of the URL. The computer further determines whether a number of accesses of the URL has increased subsequent to the posting of the URL and, responsive to determining that the number of accesses of the URL has increased subsequent to the posting of the URL, the computer determines whether the number of accesses of the URL has increased by at least a predefined threshold. Further, responsive to determining that the number of accesses of the URL has increased by at least the predefined threshold, the computer increases the ranking of the URL in a search engine.

21 Claims, 4 Drawing Sheets

(56) References Cited

U.S. PATENT DOCUMENTS

| | | |
|---|---|---|
| 2007/0198510 A1 | 8/2007 | Ebanks |
| 2008/0065600 A1 | 3/2008 | Batteram et al. |
| 2008/0301112 A1 | 12/2008 | Wu |
| 2009/0119173 A1* | 5/2009 | Parsons et al. ............... 705/14 |
| 2009/0125511 A1 | 5/2009 | Kumar |
| 2009/0171813 A1 | 7/2009 | Byrne et al. |
| 2009/0282002 A1 | 11/2009 | Reeder et al. |
| 2010/0094869 A1 | 4/2010 | Ebanks |
| 2010/0153215 A1 | 6/2010 | Abraham |
| 2010/0153371 A1 | 6/2010 | Singh |
| 2010/0174709 A1 | 7/2010 | Hansen et al. |
| 2010/0174712 A1 | 7/2010 | Li et al. |
| 2010/0228715 A1 | 9/2010 | Lawrence |
| 2010/0262806 A1* | 10/2010 | Doing et al. ............... 712/205 |
| 2011/0022602 A1 | 1/2011 | Luo et al. |
| 2011/0082858 A1 | 4/2011 | Yu et al. |
| 2011/0093460 A1 | 4/2011 | Lunt et al. |
| 2011/0137989 A1 | 6/2011 | Kiciman et al. |
| 2011/0238673 A1 | 9/2011 | Carter et al. |
| 2011/0264648 A1 | 10/2011 | Gulik et al. |
| 2011/0302521 A1 | 12/2011 | Jiang et al. |
| 2012/0023085 A1 | 1/2012 | Bellerive et al. |
| 2012/0185472 A1 | 7/2012 | Ahmed et al. |
| 2012/0284249 A1 | 11/2012 | Ahmed et al. |

OTHER PUBLICATIONS

International Search Report and Written Opinion from application PCT/IB2012/050062 mailed May 3, 2012.

* cited by examiner

UTILIZING SOCIAL NETWORK RELEVANCY AS A FACTOR IN RANKING SEARCH RESULTS

BACKGROUND

1. Technical Field

Present invention embodiments relate to the ranking of search results for network content by a search engine, in particular ranking of URL results for a search of the internet.

2. Discussion of Related Art

Search engines can utilize a number of different strategies and algorithms for prioritizing or ranking content associated with a search query. In particular, search engines which search the internet or other types of networks prioritize or rank links to uniform resource locators (URLs) based upon content associated with such URLs that is deemed relevant to a search query input by a user.

Social networks have become increasingly popular over the years. Many features of social media have developed, such as social groups or communities that allow members of a social network to follow other members and view content of interest or deemed relevance to the member being followed. For example, in the Twitter social network, followers can retweet (RT) content to their followers, and their followers RT the content to further followers, and so on. Content that can be retweeted in Twitter (or posted from one member to other members in other forms of social media) includes the posting of URLs.

Certain types of content can gain popularity rapidly at social network cites (e.g., trending topics). For example, in a Twitter environment, the number of RTs that may occur for a particular URL can increase in a rapid manner in a relatively short period of time, in particular depending upon the status of the originator of a tweet including the URL and the number of followers of the originator. Thus, the relevance of a URL can quickly increase within a social network environment. However, current search engines do not take into consideration the influence of posts (e.g., tweets or RTs) on access to content in ranking the relevance of URLs associated with such content.

BRIEF SUMMARY

Embodiments of the present invention include a method, a system and a computer program product for influencing ranking of URLs in a search engine. A determination is made that a posting of a URL has occurred in a social networking environment, and accesses of the URL are tracked subsequent to the posting of the URL. Another determination is made whether a number of accesses of the URL has increased subsequent to the posting of the URL and, responsive to determining that the number of accesses of the URL has increased subsequent to the posting of the URL, a further determination is made whether the number of accesses of the URL has increased by at least a predefined threshold. Further, responsive to determining that the number of accesses of the URL has increased by at least the predefined threshold, the ranking of the URL is increased in a search engine.

DETAILED DESCRIPTION

Present invention embodiments pertain to systems and corresponding techniques and computer program products that influence the prioritization or ranking of links to uniform resource locators (URLs) in a search engine based upon monitored postings that are associated with such URLs that occur at a social network. A URL provides a reference to a website or web page location available over a network such as the internet. A URL can be typed within a web browser application to allow a user to navigate to a particular website associated with the URL. A URL can also be provided as an HTML link within a document or other text content that allows a user to navigate to the website by activating (e.g., clicking on) the HTML link.

In accordance with the present invention embodiments, tracking of the posts of one or more URLs within a social networking environment are correlated with metrics that track the number of users accessing such URLs to assess whether accesses of a particular URL have changed significantly subsequent to the posting of the URL within the social network environment. In the event the number of accesses has increased at a URL subsequent to a post of the URL within a social networking environment, the ranking of the URL can be increased by the search engine.

Figure 1:
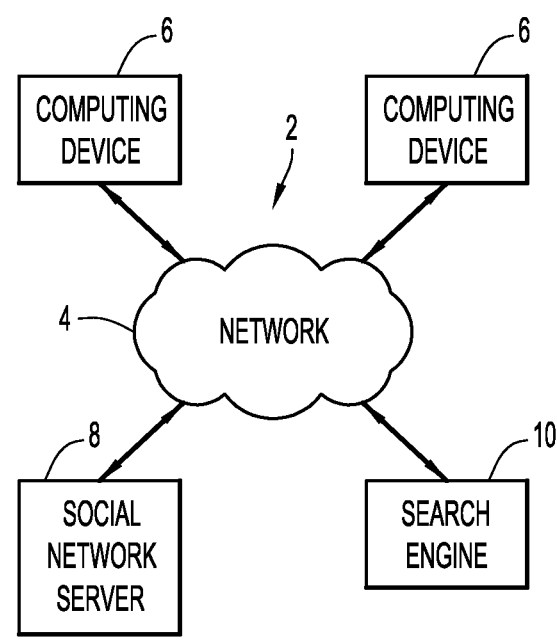
FIG. 1 is a diagrammatic illustration of a system providing a computing environment for an example embodiment of the present invention.

An example computing system that monitors postings of URLs in a social networking environment is depicted in FIG. 1. A social networking environment refers to a computing network that supports social networking activities between members or participants of the environment, where the participants connect with computing devices to one or more social network host servers and communicate in social networking activities with each other via email, instant messaging, web conferencing, group chatting, posting of messages or any other forms of content, blogging and any other types of exchange of digital data comprising communications between users. Example embodiments of social networking environments include, without limitation, Twitter, Facebook, MySpace, LinkedIn, Google+, etc.

System 2 includes a plurality of computing devices 6 connected, via a network 4, to other computing devices. For example, the computing devices 6 can connect to communicate with each other within a social networking environment via one or more social network servers 8. Computing devices 6 can further connect, via the network 4, to one or more search engines 10. It is noted that the number of computing devices 6, social network servers 8 and search engines 10 depicted in FIG. 1 is for example purposes only, and the system can include any suitable number of each (e.g., several thousand or more computing devices 6 connecting with multiple social network servers 8 and having access to multiple search engines 10).

The network 4 can be implemented by any number of any suitable communications media (e.g., wide area network (WAN), local area network (LAN), Internet, Intranet, etc.).

Each of the computing devices 6, social network servers 8 and search engines 10 can be implemented by any conventional or other computer systems optionally equipped with a display or monitor, a base, where the base includes at least one processor, memory and/or an internal or external network interface or communications device (e.g., modem, network cards, etc.) that facilitates connection with other computing devices over the network 4, optional input devices (e.g., a keyboard, mouse, or other input device), and any commercially available and custom software (e.g., internet browser software, communications software, server software, search engine and/or web crawling software, etc.). The computing devices may include server, desktop, laptop, and hand-held computing devices (e.g., smart phones, PDAs, notebooks, tablets, etc.).

Figure 2:
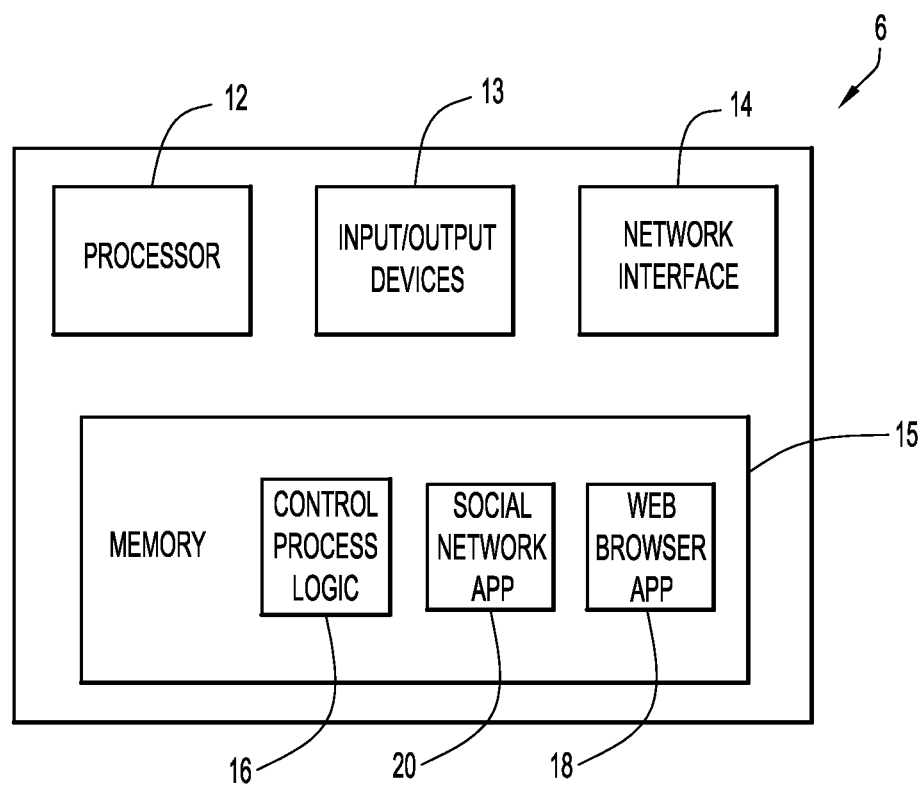
FIG. 2 is a diagrammatic illustration of a computing device utilized with the system of FIG. 1 according to example embodiments of the present invention.

An example embodiment of a computing device is depicted in FIG. 2. The computing device 6 includes a processor 12, input and output devices 13 (e.g., keyboard, mouse, camera, microphone, display, etc.), a network interface unit 14 (e.g., modem, network card, etc.) that facilitates communication with other computing devices over the network 4, and a memory 15. The memory 15 can be RAM and/or ROM memory configured as one or more hardware units of the computing device. The memory 15 includes a control process logic software module 16 including operating system code for the processor 12 as well as any other commercially available and custom software to facilitate operations of the computing device 6 utilizing the processor 12. The memory 15 further includes a web browser application module 18 including one or more web browser applications (e.g., Microsoft Internet Explorer, Mozilla Firefox, etc.) that facilitate internet web browsing over the internet.

In addition, the memory 15 can optionally include a social network application module 20 that includes any applications that may be necessary to engage and operate within a social network environment (e.g., for logging on or connecting with one or more social network servers 8 to facilitate interaction of the participant/user of the computing device 6 with participants/users of other computing devices also connected via the social network server(s) 8). In an example embodiment, a social networking environment (e.g., Twitter) allows a user to log on or connect within the social networking environment by simply using a web browsing application (e.g., from module 18) that allows the user to connect with an internet website hosted by one or more social network servers 8, where the user of the computing device 6 interacts and communicates with other users operating their computing devices via interactions at the internet website hosted by the network server(s) 8. In other embodiments, one or more social network applications (e.g., stored within module 20) may be required to connect with one or more servers 8 in order to engage and interact within the social networking environment.

Each social network server 8 can be configured as any suitable network server computing device, with one or more processors, memory including control process logic for operation of the server and any suitable number of social network applications that facilitate hosting of social networking operations by the server 8 for users/participants within the social networking environment.

Figure 3:
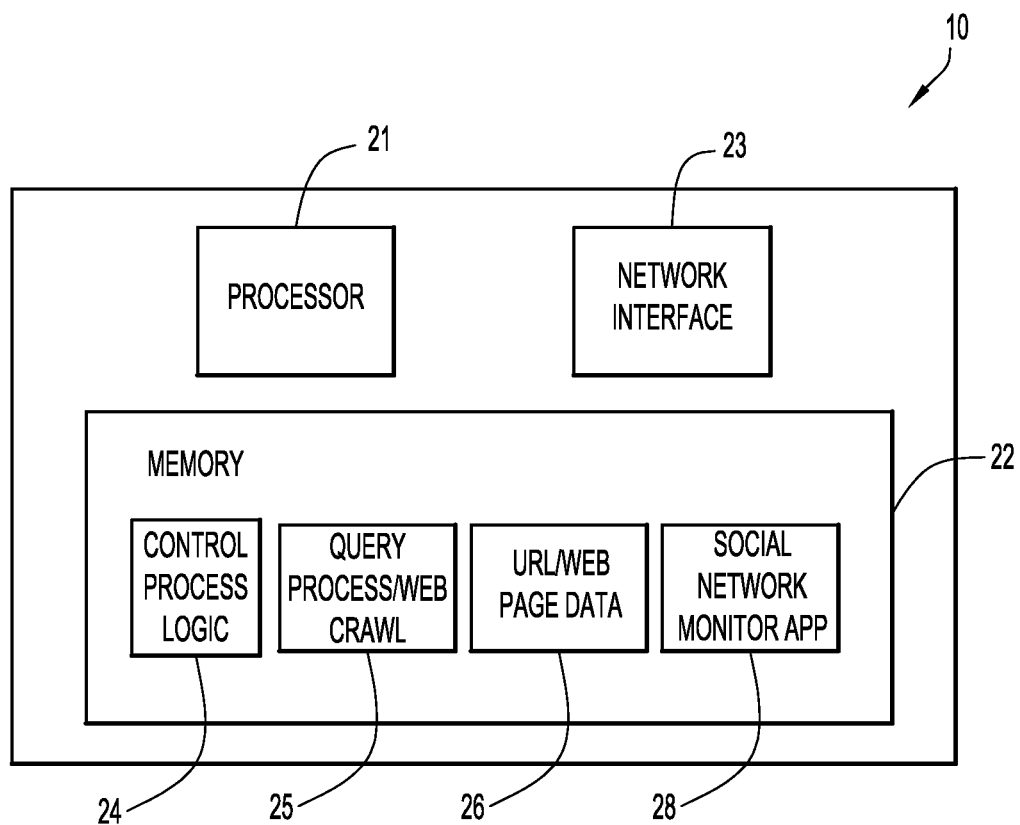
FIG. 3 is a diagrammatic illustration of a search engine computing device utilized with the system of FIG. 1 according to example embodiments of the present invention.

An example embodiment of a search engine 10 is depicted in FIG. 3. The search engine 10 can be any suitable computing device including a processor 21, a network interface unit 23 (e.g., modem, network card, etc.) that facilitates communication with other computing devices over the network 4, and a memory 22. The memory 22 can also be RAM and/or ROM memory configured as one or more hardware units of the computing device. The memory 22 includes a control process logic software module 24 including operating system code for the processor 21 as well as any other commercially available and custom software to facilitate operations of the search engine 10 utilizing the processor 21.

The memory 22 also includes a search query processing and web crawling application module 25 comprising one or more suitable applications that facilitate receipt and processing of a search query by a user of a computing device that accesses the search engine (e.g., via a website associated with the search engine) and conducting a search of the internet (or any defined network) for URLs containing content that is deemed relevant to the search query. The one or more applications of the module 25 further provide a ranking of search results based upon relevance of the content associated with each URL in relation to the search query. For example, the ranking of search results can be provided as a listing of URLs (e.g., as HTML links) at a search result website (e.g., one or more web pages of the website) that are provided in response to a user's search query. The general search engine functions for web crawling based upon a search query to find search results and providing a ranking of such search results based upon relevancy in the form of a prioritized listing of URLs is known (e.g., searching provided by known search engines such as Google, Yahoo!, AltaVista, Bing, etc.).

The memory 22 of the search engine 10 further includes a URL/web page data module 26 comprising one or more applications that track metrics associated with URLs, including metrics regarding the number of accesses by users occurring at a website associated with a URL over any given time period. For example, the search engine 10, via the module 26, can track the number of times or a frequency of visits to a website associated with a particular URL by users over an hourly period, a daily period, a weekly or monthly period, etc. The memory 22 includes a social network monitoring module 28 comprising one or more applications that monitor when certain types of content, including URL content, is posted at a website associated with a particular social networking environment (e.g., in Twitter, Facebook, etc.). By monitoring postings of certain types of content within specific social networking environments, an originator of such content (e.g., an original post of a URL at a social network website such as Twitter, Facebook, etc.) and the date/time at which such content originated can be determined by the search engine 10.

Figure 4:
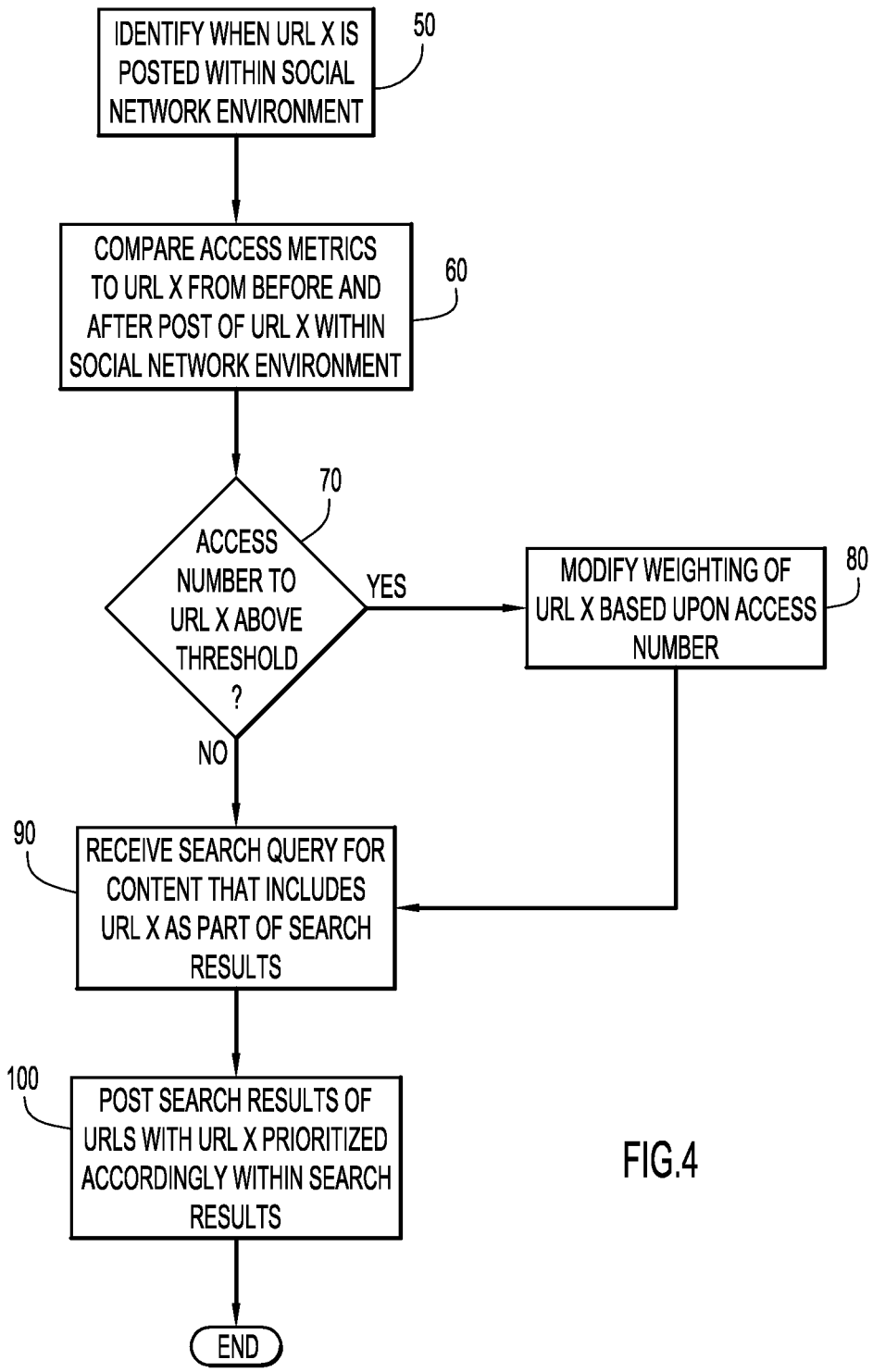
FIG. 4 is a procedural flow chart illustrating techniques in which the prioritization of search results from a search engine is modified based upon monitoring of posting metrics in a social media environment according to example embodiments of the present invention.

Operation of the system of FIGS. 1-3 to monitor the posting of content such as URLs within a social networking environment and modifying the ranking of a URL based upon its established relevancy within the social networking environment is described with reference to the flow chart of FIG. 4. A social networking environment hosted by one or more social network servers 8 (e.g., Twitter, Facebook, etc.) is monitored to determine when any URLs are posted by a user/participant of social networking environment (e.g., a user having a Twitter account, or a Facebook account, etc.). The monitoring can be achieved by a search engine (e.g., using the social network monitor application module 28 of a search engine 10) and/or by any other computing device. For example, one or more social network servers 8 can monitor the content and report to designated search engines information associated with URLs that are posted within the social networking environment, including information regarding a time stamp for when a specific URL originated or was originally posted along with the originator of the URL post (e.g., identification of the user who originally posted the URL).

An example of monitoring of URLs posted within the social networking environment is in relation to a URL identified as URL X. Identification is made regarding when URL X was posted within the social networking environment (step 50). For example, a user or participant at a social networking environment posts a URL as part of content within the environment (e.g., by sending an email, a post, a blog, an instant message, etc.). As previously noted herein, detection of the originating post can be determined by a search engine 10 and/or by one or more social network servers 8 associated with the social networking environment. The identification determines when the posting of URL X originated within the social networking environment (e.g., by recording a time stamp associated with the time and/or date of when the URL X was first posted) as well as optional additional information such as an identification of the user originating the post.

The metrics about the website associated with URL X are also monitored to determine the number of accesses to the website via URL X both before and after the original posting of the URL X within the social networking environment (step 60). The monitoring of metrics associated with URL X can be achieved via the search engine (e.g., via the URL/web page data module 26 of the search engine 10) and/or via any suitable computing device (e.g., a computing device that hosts the content posted at the website associated with URL X) that includes one or more software applications designed to monitor metrics associated with URL X. An example embodiment showing metrics associating accesses to URL X to clicks on a URL (e.g., the URL X or a short URL that links to URL X) within a social networking environment is set forth in the Table below. The example embodiment monitors the number of click-throughs within the social networking environment. A click-through represents that a user has obtained access to a URL via a short URL. For example, in a Twitter environment, the number of Twitter clicks by users to gain access to URL X can be monitored.

TABLE

Comparing URL X Accesses With Postings
Within Social Networking Environment

| Month | Accesses to URL X | Number of Click-Throughs |
|---|---|---|
| March 2011 | 120 | 10 |
| February 2011 | 80 | |
| January 2011 | 76 | 2 |
| December 2010 | 103 | 5 |
| November 2010 | 126 | 13 |
| October 2010 | 28 | |
| September 2010 | 30 | |
| August 2010 | 37 | |
| July 2010 | 16 | |

As can be seen from the metrics in the table (obtained from steps 50 and 60), the originating post of URL X occurred within the social networking environment sometime around November 2010, since the first number of click-throughs associated with URL X occurred in this month. The number of click-throughs could be, e.g., the number of Twitter clicks that occurred within Twitter as a result of tweets and retweets (RTs) of URL X (or a short URL that links with URL X) in Twitter (e.g., 13 tweets/RTs in November 2010 that include URL X in the tweeted content). The originator of the post (e.g., the originator of the tweet that results in RTs) that includes URL X can also be identified, e.g., as user A.

It is determined whether the number of accesses to URL X that occur after an original posting of URL X has increased to a number that is above a predetermined threshold (step 70). This determination can be made, e.g., by the search engine (e.g., utilizing one or more of modules 26 and 28 of search engine 10). As can be seen from the data in the table, accesses to URL X occurring prior to the first or original post of URL X within the social networking environment averaged less than 30 per month (e.g., the average number of accesses over the two months September and October 2010 was 29). After the original post of URL X within the social networking environment (as indicated by the first number of click-throughs occurring that led users within the social networking environment to URL X), which occurred in November 2010, the average number accesses over the months of November and December 2010 was 114 ((126+103)÷2). In a scenario in which a minimum threshold for increase in accesses to a URL such as URL X is 100%, the number of accesses starting at November 2010 would be above the minimum threshold, since the number of accesses increased by well over 100% in comparison to the previous month or an average of the previous two or even three months. The determination of the number of previous months to consider (e.g., one or more) in determining whether the number of accesses to an URL in any given month after the posting of the URL within the social networking environment can be set to any suitable number based upon a particular scenario. Thus, in the scenario in which the minimum threshold value is set to at least a 100% increase in accesses in comparison to a number of accesses for one or more prior months, the months of November 2010 to at least March 2011 provide a number of accesses that exceeds or is greater than the established or predetermined threshold.

In response to the number of accesses for a given time period (e.g., a month in the given scenario) exceeding the predetermined threshold, the relevancy weighting or ranking of URL X for any given search result determination is increased by a certain amount (step 80). For example, the weighting or ranking of the URL X can be increased by a set or constant percentage (e.g., 10% or more) based upon a determination (at step 70) that the threshold has been exceeded. In other words, regardless of how great the increase in number of accesses to URL X is for a given time period, the increase in the relevancy weighting for URL X remains the same. In another example embodiment, the increase in relevancy weighting or ranking for URL X can change based upon the amount or degree of the increase in relation to the threshold value. For example, in the scenario described in which the minimum threshold is a 100% increase in number of accesses to URL X, when the increase in number of accesses over a given time period (e.g., over a month) is within a first range above the threshold (e.g., between 100% to 200%), the increase in relevancy weighting or ranking applied to URL X can be set to a first value (e.g., increase relevancy weighting or ranking by 10%). When the increase in number of accesses over the given period of time is within a second range above the threshold (e.g., between 200% to 300%), the relevancy weighting or ranking applied to URL X can be set to a second value (e.g., increase relevancy weighting or ranking by 20%), when the increase is within a third range above the threshold (e.g., between 300% to 400%), the relevancy weighting or ranking applied to URL X can be set to a third value (e.g., increase relevancy weighting or ranking by 30%), and so on. In addition, the threshold value can simply be a predetermined number instead of a percentage increase. For example, when a number of accesses at a URL during a given time period (e.g., day, week or month) exceeds a minimum threshold value (e.g., 100), this can be the determination to increase the relevance weighting or ranking of the URL by the search engine within a search result based upon a search query.

The relevancy weighting associated with a URL can also change over periods of time from which the URL was originally posted within the social networking environment. For example, referring again to the table comparing accesses to URL X in relation to postings including URL X within a social networking environment, it can be seen that November 2010, which is also the month in which the posting of URL X originated within the social networking environment, has a significant increase in the number of accesses compared with the previous month. The access number in December 2010 is also still large but then tapers off somewhat in the months of January and February 2011, followed by another increase in March 2011. This can result in a corresponding change in relevancy weighting, where the increase in ranking of URL X in the search results for the same search query will be less significant in the months of January and February compared to the months of November, December and March. The relevancy weighting can thus change over periods of time, resulting in a change in the amount or degree in which the ranking of URL X may be increased within a prioritized listing of search results.

The relevancy weighting can be applied to the URL X based upon its ranking in the search results of a particular query. A search engine (such as search engine 10) receives a search query (step 90) input by a user accessing the search engine (e.g., via a website hosted by the search engine), where the search query generates search results that includes URL X. The search results are posted by the search engine (e.g., at the website hosted by the search engine), in which URLs found that are relevant to the search are listed in a prioritized order of relevancy based upon the search query and the algorithm used by the search engine to find and prioritize search results that relate to the search query (step 100).

In an example scenario, URL X is considered relevant to a specific search query and is thus provided within the prioritized list of search results. The weighting of URL X is modified in response to the monitored number of accesses being increased above a threshold value after an original posting of the URL X within the social networking environment (steps 50-80), and the prioritizing or ranking of URL X within the list of search results changes accordingly. For example, in a search result that initially prioritizes or ranks URL X as a rank number 20 based upon the criteria and algorithm(s) utilized by the search engine to find and prioritize search results given a specific search query (i.e., there are 19 other URLs considered of greater relevance and thus higher in the search order than URL X), and given that the weighting of URL X is modified by 10% based upon its posting within a social network environment and a resultant increase in number of accesses to URL X, the 10% weighting increase associated with URL X can change its rank number (e.g., increasing the rank number of URL X from 20 to 18 or an even higher ranking).

The increase in ranking of a URL based upon a suitable increase in accesses to the URL after posting of such URL within a social networking environment can be applied by the search engine in a selective manner based upon the user at the computing device that initiates a search query with the search engine. For example, a participant of a social networking environment (e.g., Twitter) can initiate a search for content over the internet via a search engine 10. The search engine 10 can identify (e.g., utilizing module 25 and/or module 28) whether the computing device 6 initiating the search query is a participant or member of the social networking environment via its interaction with the computing device 6. In another alternative example embodiment, the user at computing device 6 can initiate a search query with the search engine 10 while operating within the social networking environment. After a determination that the user initiating the search query is also a participant or member of the social networking environment, the search engine 10 can determine whether any URLs found in the search based upon the search query should have a rank increase based upon the techniques described above and depicted in FIG. 4, and appropriate changes to the search result rankings are implemented as warranted such that the listing of search results increases the ranking of such URLs determined to have an increase in relevancy weighting.

As an optional feature, the relevancy of the posting of a URL within a social networking environment can further be assessed prior to making any changes in the relevancy weighting of the URL for a user initiating a search query with a search engine. For example, if a determination is made by the search engine 10 that the user initiating the search query is not a participant or member within the social networking environment in which the URLs have been posted, the search engine can determine that no modification should be made to the ranking of URLs in the search results based upon posting of such URLs in the social networking environment. This is because there is no special relevancy to this user of such URLs (since the user is not associated with this social networking environment).

In another example, consider a user initiating a search query who is a participant or member of a social networking environment but is not a follower or is not associated with any of the posts made within the environment that include URLs that were found as part of the search result from the search query. In this scenario, a determination can also be made by the search engine that there should be no relevancy weighting for any posted URLs in relation to the search results (i.e., the rankings of these URLs will not change in the search results). Alternatively, the search engine can apply a relevancy weighting to such URLs but with a lower value (e.g., a 5% increased weighting instead of a 10% increased weighting) in relation to the relevancy weighting associated with a user who is a follower or is associated in some manner with the postings including such URLs.

The search engine 10 (e.g., utilizing one or more of modules 25, 26 and 28) can also determine whether any relevancy weighting should be applied at all to a URL based upon the length of time that has occurred since any posting of such URL within a social networking environment or any identified click-through by a member that resulted in the member accessing the URL via the social networking environment. For example, if a specified period of time (e.g., 3, months, 6 months or 1 year) has passed in which there has been no posting of content including a URL or the number of postings of content including the URL has diminished below a threshold value, the search engine 10 can determine that no further relevancy weighting should be applied to the URL or that the relevancy weighting should be adjusted in some manner (e.g., reduced by a specified amount).

The search engine 10 can also monitor the level of activity over a specified period of time within the social networking environment associated with the URL and use this information to adjust the relevancy weighting of the URl. For example, the search engine 10 can monitor a number of postings or the number of click-throughs to a URL that occur within the social networking environment (e.g., utilizing module 28) and over a given time period (e.g., within one month) and utilize this information to further modify the relevancy weighting for a URL. For example, if the Twitter account of a user includes a significant number (e.g., a predetermined threshold number) of tweets and RTs of content including a URL, or there are a significant number (e.g., a predetermined threshold number) of Twitter through-clicks associated with the URL (e.g., via a short URL associated with the URL) and the number of accesses to this URL has increased significantly since the original tweet so as to exceed the minimum threshold value for determining whether to increase the relevancy weighting of the URL, the search engine 10 can use this information to modify the amount or degree with which to increase the relevancy weighting. For example, consider a scenario in which, after an original tweet of a URL Z in January, the number of accesses to the URL Z increases to an extent that exceeds the minimum threshold value such that a relevancy weighting to be applied is set at 10% (e.g., the ranking of URL Z in any search results by the search engine 10 will increase by 10% of its ranking prior to applying the relevancy weighting). In February, the number of accesses to URL Z is similar to the month of January but the number of tweets and RTs of this URL Z increases significantly so as to rise above a predetermined threshold number. In this case, the search engine 10 can determine that the relevancy weighting should be further adjusted for URL Z to a higher value, such as 15%.

Thus, the systems, computer program products and corresponding methods described herein facilitate an enhancement in providing search results for search queries utilizing a search engine (e.g., internet searches), where the relevancy of URLs within one or more social networking environments is utilized as a factor to determine whether to modify the ranking of search results based upon such determined relevancy.

It will be appreciated that the embodiments described above and illustrated in the drawings represent only a few of the many ways of implementing embodiments for utilizing social network relevancy as a factor in ranking search results.

The topology or environment of the present invention embodiments may include any number of computer or other processing systems (e.g., client or end-user systems, server systems, etc.) and search engines, databases, or other repositories arranged in any desired fashion, where the present invention embodiments may be applied to any desired type of computing environment (e.g., cloud computing, client-server, network computing, mainframe, stand-alone systems, etc.). The computing devices and other processing systems employed by the present invention embodiments may be implemented by any number of any personal or other type of computer or processing system (e.g., desktop, laptop, PDA, mobile devices, etc.), and may include any available operating system and any available or custom software (e.g., browser software, communications software, server software, natural language processing software, search engine and web crawling software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among any one or more types of computing systems, including end-user/client and server systems, and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number data sources implemented as any conventional or other types of databases, data stores or storage structures to store content associated with URLs and to facilitate searching of such content by search engines.

The present invention embodiments may employ any number of any type of user interface (e.g., Graphical User Interface (GUI), command-line, prompt, etc.) for obtaining or providing information (e.g., obtaining information for a desired search query of one or more data sources utilizing one or more search engines, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, hardwired, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of influencing a ranking of Uniform Resource Locators (URLs) in a search engine, the method comprising the steps of:
   a computer determining that a first posting of a URL in a social networking environment has occurred in response to determining that the URL was accessed by a user clicking on the URL within the social networking environment;

the computer comparing a number of accesses of the URL before the first posting of the URL in the social networking environment and subsequent to the first posting of the URL in the social networking environment;
the computer determining, based on the comparison, whether the number of accesses of the URL has increased subsequent to the first posting of the URL in the social networking environment;
responsive to determining that the number of accesses of the URL subsequent to the first posting of the URL in the social networking environment has increased, the computer determining whether the number of accesses of the URL has increased by at least a predefined threshold, the predefined threshold specifying a minimum increase in the number of accesses; and
responsive to determining that the number of accesses of the URL has increased by at least the predefined threshold, the computer increasing the ranking of the URL in a search engine.

2. The method of claim 1, wherein the computer increasing the ranking of the URL in the search engine further comprises:
the computer increasing the ranking of the URL to a percentage that is based upon a degree of the increase of the number of accesses of the URL subsequent to the first posting of the URL in the social networking environment in relation to the predefined threshold.

3. The method of claim 1, wherein the computer increasing the ranking of the URL in the search engine further comprises:
the computer increasing the ranking of the URL to a constant percentage when the number of accesses of the URL subsequent to the first posting of the URL in the social networking environment is above the predefined threshold.

4. The method of claim 1, further comprising:
obtaining search results, via the search engine, based upon a user initiating a search query, the search results including the URL posted within the social networking environment; and
the computer increasing the ranking of the URL when the user initiating the search query is determined to be a member of the social network in which the URL was first posted.

5. The method of claim 1, wherein the computer comprises the search engine.

6. The method of claim 1, wherein the computer is separate from the search engine.

7. The method of claim 1, further comprising:
adjusting the ranking of the URL in the search engine based upon a determined level of activity associated with the URL over a specified period of time within the social networking environment.

8. The method of claim 1, further comprising:
the computer changing the ranking of the URL in the search engine over a period of time based upon a change in degree of increase of the number of accesses of the URL subsequent to the first posting of the URL in the social networking environment in relation to the predefined threshold.

9. A system for influencing a ranking of Uniform Resource Locators (URLs) in a search engine, the system comprising:
a processor comprising a memory configured to:
determine that a first posting of a URL in a social networking environment has occurred in response to determining that the URL was accessed by a user clicking on the URL within the social networking environment;
compare a number of accesses of the URL before the first posting of the URL in the social networking environment and subsequent to the first posting of the URL in the social networking environment;
determine, based on the comparison, whether the number of accesses of the URL has increased subsequent to the first posting of the URL in the social networking environment;
responsive to determining that the number of accesses of the URL subsequent to the first posting of the URL in the social networking environment has increased, determine whether the number of accesses of the URL has increased by at least a predefined threshold, the predefined threshold specifying a minimum increase in the number of accesses; and
responsive to determining that the number of accesses of the URL has increased by at least the predefined threshold, increase the ranking of the URL in a search engine.

10. The system of claim 9, wherein the processor is further configured to:
increase the ranking of the URL to a percentage that is based upon a degree of the increase of the number of accesses of the URL subsequent to the first posting of the URL in the social networking environment in relation to the predefined threshold.

11. The system of claim 9, wherein the processor is further configured to:
increase the ranking of the URL to a constant percentage when the number of accesses of the URL subsequent to the first posting of the URL in the social networking environment is above the predefined threshold.

12. The system of claim 9, wherein the system comprises the search engine, and the processor is further configured to:
obtain search results, via the search engine, based upon a user initiating a search query, the search results including the URL posted within the social networking environment; and
increasing the ranking of the URL when the user initiating the search query is determined to be a member of the social network in which the URL was first posted.

13. The system of claim 9, wherein the system is separate from the search engine.

14. The system of claim 9, wherein the processor is further configured to:
adjust the ranking of the URL in the search engine based upon a determined level of activity associated with the URL over a specified period of time within the social networking environment.

15. The system of claim 9, wherein the processor is further configured to:
change the ranking of the URL in the search engine over a period of time based upon a change in degree of increase of the number of accesses of the URL subsequent to the first posting of the URL in the social networking environment in relation to the predefined threshold.

16. A computer program product for influencing a ranking of Uniform Resource Locators (URLs) in a search engine, the computer program product comprising:
a non-transitory computer readable storage medium having computer readable program code embodied therewith, the computer readable program code configured to:
determine that a first posting of a URL in a social networking environment has occurred in response to determining that the URL was accessed by a user clicking on the URL within the social networking environment;

compare a number of accesses of the URL before the first posting of the URL in the social networking environment and subsequent to the fir posting of the URL in the social networking environment;

determine, based on the comparison, whether the number of accesses of the URL has increased subsequent to the first posting of the URL in the social networking environment;

responsive to determining that the number of accesses of the URL subsequent to the first posting of the URL in the social networking environment has increased, determine whether the number of accesses of the URL has increased by at least a predefined threshold, the predefined threshold specifying a minimum increase in the number of accesses; and responsive to determining that the number of accesses of the URL has increased by at least the predefined threshold, increase the ranking of the URL in a search engine.

17. The computer program product of claim 16, wherein the computer readable program code is further configured to:
increase the ranking of the URL to a percentage that is based upon a degree of the increase of the number of accesses of the URL subsequent to the first posting of the URL in the social networking environment in relation to the predefined threshold.

18. The computer program product of claim 16, wherein the computer readable program code is further configured to:
increase the ranking of the URL to a constant percentage when the number of accesses of the URL subsequent to the first posting of the URL in the social networking environment is above the predefined threshold.

19. The computer program product of claim 16, wherein the computer readable program code is further configured to:
obtain search results, via the search engine, based upon a user initiating a search query, the search results including the URL posted within the social networking environment; and
increase the ranking of the URL when the user initiating the search query is determined to be a member of the social network in which the URL was first posted.

20. The computer program product of claim 16, wherein the computer readable program code is further configured to:
adjust the ranking of the URL in the search engine based upon a determined level of activity associated with the URL over a specified period of time within the social networking environment.

21. The computer program product of claim 16, wherein the computer readable program code is further configured to:
change the ranking of the URL in the search engine over a period of time based upon a change in degree of increase of the number of accesses of the URL subsequent to the first posting of the URL in the social networking environment in relation to the predefined threshold.

\* \* \* \* \*